Figure 1:
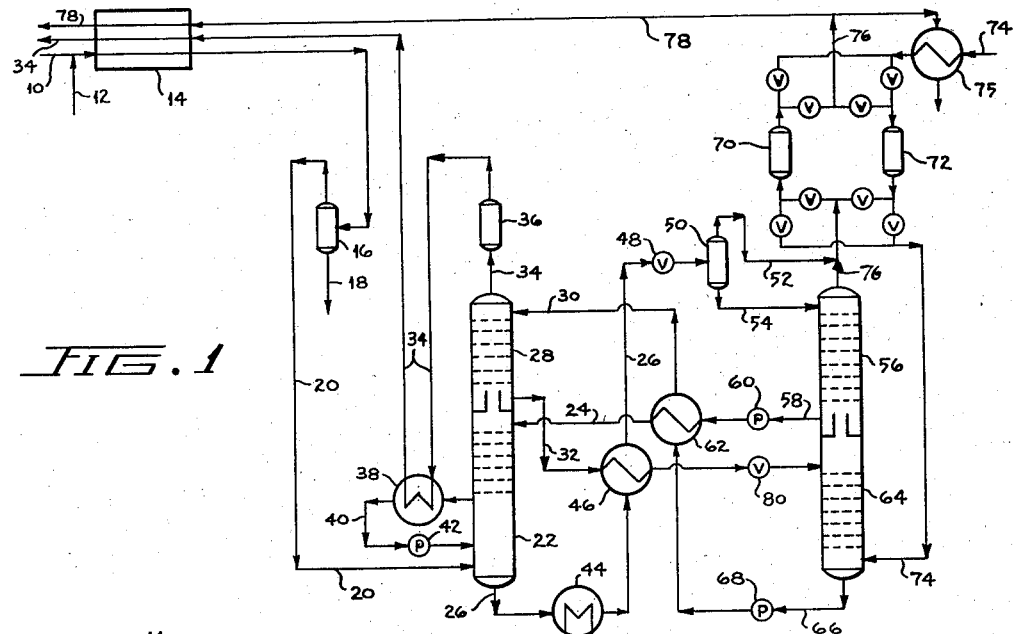

April 7, 1959 M. KWAUK 2,880,591
LOW-TEMPERATURE GAS ABSORPTION
Filed June 23, 1955

INVENTOR.
MOOSON KWAUK
BY Paul W. Garbo
AGENT 2,880,591

LOW-TEMPERATURE GAS ABSORPTION

Mooson Kwauk, Jamaica, N.Y., assignor to Hydrocarbon Research, Inc., New York, N.Y., a corporation of New Jersey Application June 23, 1955, Serial No. 517,514

26 Claims. (Cl. 62—17)

This invention relates to the separation and purification of mixed gases by low-temperature absorption. More particularly, this invention relates to the problem of removing an acidic gas such as carbon dioxide ($CO_2$) from a gaseous mixture. Absorption processes known to the art suffer from the dual disadvantages of high initial capital outlays and expensive utility requirements of power, heat and refrigeration. The commercially successful processes employing monoethanolamine and diethanolamine are nonetheless expensive in capital and operating costs. Even prior workers in the art, e.g., Burmann et al. U.S. Patent 1,942,131, investigating low-temperature absorption for $CO_2$ removal suggested processes using large quantities of heat and refrigeration from external sources.

A primary object of this invention is to purify mixed gases by an efficient low-temperature absorption requiring little or no refrigeration from external sources.

Another important object is to provide a low-temperature absorption system for substantially complete removal of acidic gases like $CO_2$ and hydrogen sulfide ($H_2S$) from a hydrogen-containing gas.

Still a further object is to provide a low-temperature absorption system wherein the temperatures of absorption and desorption are kept at desired levels by heat exchange between enriched and stripped absorbent streams.

Briefly stated, this invention comprises a multiple-stage low-temperature absorption process wherein mixed gases are passed under pressure through a rich absorption zone in countercurrent contact with a rich absorber liquid, then through a lean absorption zone in countercurrent contact with a lean absorber liquid whereby at least one component of the mixed gases is substantially completely removed from the gaseous stream, the absorber liquids being respectively stripped in a rich stripping zone and a lean stripping zone at low pressures. The desired temperature relationships between absorbers and strippers are maintained by warming enriched lean absorber liquid through heat exchange with enriched rich absorber liquid and by cooling stripped lean absorber liquid through heat exchange with stripped rich absorber liquid. Importantly, any refrigeration from external sources is added at substantially the highest temperature level attained by the rich absorber liquid.

Although of general applicability, the process of this invention will be described in terms of removing $CO_2$ from mixed gases. For brevity, hereinafter rich absorber liquid and lean absorber liquid will be termed rich liquid and lean liquid, respectively.

The rich absorption and stripping zones are operated substantially non-isothermally; inlet and outlet temperatures are controlled to avoid freezing rich liquid at the coldest point and overheating at the hottest point but otherwise the rich liquid is allowed to seek its own temperature level at intermediate points in these zones. The upper temperature limit, which for $CO_2$ may fall in the range of —15 to +15° F., is generally a temperature which allows an optimum liquid circulation rate consistent with reasonably complete removal of $CO_2$ from the gaseous stream in the rich absorption zone.

Referring, for example, to the absorption of $CO_2$ in acetone, raising the temperature at the hottest point much above 15° F. would require increasingly larger amounts of acetone because the solubility of $CO_2$ in acetone decreases sharply with increasing temperature. It may also make difficult the attainment of a desired temperature at the coldest point.

Generally speaking, just as the heat of absorption raises the liquid temperature in the rich absorption zone, so does the refrigerating effect of desorption lower the liquid temperature in the rich stripping zone. Therefore, the hottest point is at the outlet of the rich absorption zone; the coldest point is correspondingly at the outlet of the rich stripping zone. The actual temperature at the outlet of the rich stripping zone is preferably just above the freezing point of the rich liquid. Freezing can be avoided by control of the temperatures in the system. For $CO_2$ absorption, maintaining the hottest point much below —15° F. may result in freezing up the rich stripping zone. In any event, the cost of supplying refrigeration increases as the temperature level at which it must be supplied is lowered.

In general, the rich absorption zone is operated to remove the bulk of the $CO_2$. The lean absorption zone is relied upon to approach substantially complete removal. Thus, the determining limit for the lean absorption zone is the desired composition of the exiting gas. Accordingly, lean absorber liquid enters this absorption zone substantially free of $CO_2$ at as low a temperature as is reasonably possible in order to minimize the partial pressure of gaseous $CO_2$ in equilibrium with the lean liquid and, therefore, the $CO_2$ content of the effluent gas. The advantage of a low temperature in the lean liquid supplied to the lean absorption zone is particularly pronounced where a troublesome or undesirable gas like $H_2S$ is to be eliminated from the gaseous stream. While the lean liquid should absorb at minimum temperatures, complete desorption requires stripping at much higher temperatures. Advantageously, heat exchange between lean liquid removed from the lean absorption zone and rich liquid from the rich absorption zone (at substantially the hottest point) warms the lean liquid to desired stripping temperatures. Likewise, heat exchange between stripped lean liquid and stripped rich liquid (at substantially the coldest point) serves to recool the lean liquid. If desired, the heat exchangers may be placed, respectively, inside the rich absorption and the rich stripping columns.

This specific heat exchange between rich and lean absorber liquids produces an advantageous cooperation. A minor temperature rise occurs in the liquid passing through the lean absorption zone. At the higher temperature level of stripping, a corresponding temperature drop occurs in the liquid during passage through the lean stripping zone. Thus, the liquid temperature at the entrance of the lean absorption zone is the lowest and the liquid temperature at the entrance of the lean stripping zone is the highest in the lean liquid circuit. The cooling of the stripped lean liquid to its lowest extreme and the heating of the enriched lean liquid to its highest extreme are effected with refrigeration and heat from sources outside the lean liquid circuit. The warm rich liquid resulting from non-isothermal operation of the rich absorption zone offers a convenient source of heat just as the cold rich liquid from the rich stripping zone offers a convenient source of refrigeration. At the same time, this dual and balancing heat exchange between rich and lean liquids tends merely to make the rich absorption run somewhat warmer and the rich stripping run correspondingly colder.

The temperature of the lean absorber liquid entering the lean absorption zone is desirably maintained constant and the overall system is controlled accordingly by adding heat or refrigeration to the rich liquid. Refrigeration added to the rich liquid anywhere in its circuit will serve to lower the temperature level throughout. For example, precooling the feed gas is a satisfactory manner of adding refrigeration. Highly advantageous is refrigeration applied to the rich liquid while in the rich absorption zone. However, construction costs may make it unduly expensive to apply all possible refrigeration directly to the rich absorption zone. In that instance, refrigeration is preferably applied to the rich liquid leaving the rich absorption zone. Whenever refrigeration from an external source must be provided, it is best added at the warmest point in the system. Moreover, because refrigeration applied at subzero levels is costly, the warmest point is generally in the vicinity of 0° F.

By and large, for any rich liquid, the highest and lowest temperature levels attainable are also determined by the liquid circulation rate as well as by the existing pressure of the incoming feed gas and the partial pressure of the $CO_2$ in that gas. To a great extent, compensating variations in the rich liquid circulation rate allow operation of the process in the desired temperature range under widely divergent feed gas pressure conditions. Generally, the absorption zones are at pressures of at least 50 pounds per square inch gage (p.s.i.g.) and the stripping zones at substantially atmospheric pressure.

Any liquid, e.g., acetone or methanol, which will differentially absorb $CO_2$ from other gases like $N_2$, $H_2$ and CO and has a low freezing point is a suitable absorbent for the process of this invention. Advantageously, the same absorbent may constitute both lean and rich liquids.

Figure 2:
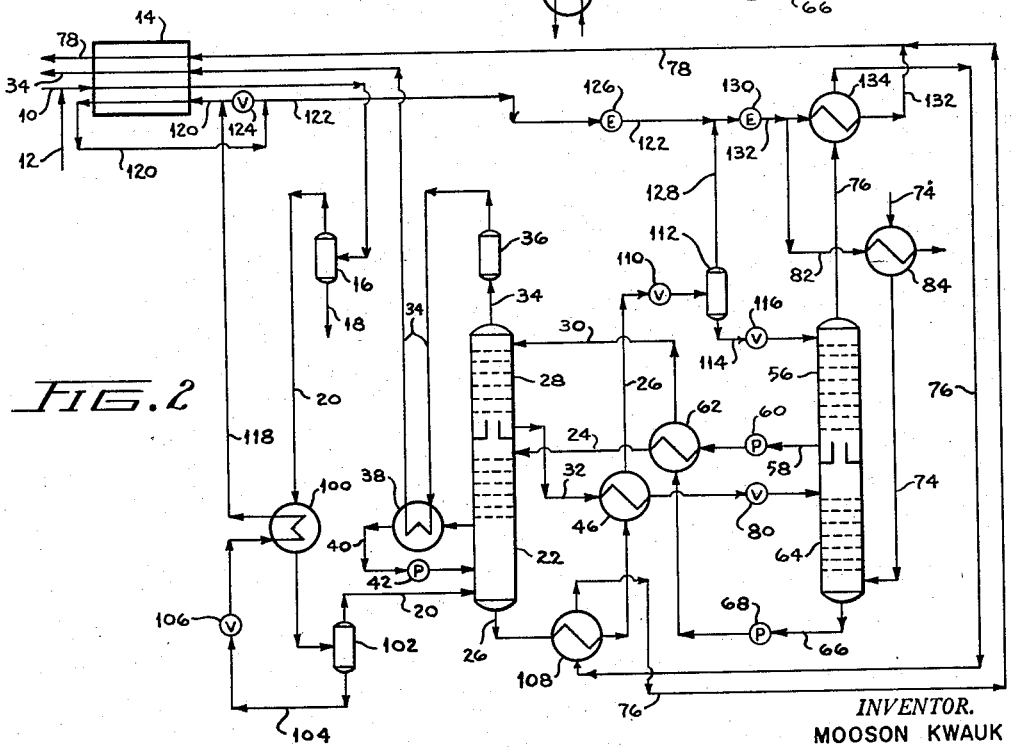

In the accompanying drawings forming a part of this disclosure and showing for purposes of exemplification preferred forms of the invention:

Figure 1 diagrammatically shows an absorption system involving extraneous refrigeration, and Figure 2 similarly shows an absorption system which generates the required refrigeration.

In Figure 1, an ammonia synthesis gas (by volume 57.3% $H_2$, 38.4% $CO_2$, 2.5% CO, 1.5% $CH_4$ and traces of $H_2O$, $H_2S$) at a temperature of 100° F. and a pressure of 400 p.s.i.g. enters heat exchanger 14 through line 10. A small amount of acetone is added through line 12 to prevent formation of ice and gas hydrates in exchanger 14 and the mixture is cooled in exchanger 14 to a temperature of —50° F. Liquefied components, notably the added acetone and water, are separated in knockout drum 16, being removed through line 18, while the gas passes through line 20 into rich absorber 22.

Acetone entering th etop of the absorber 22 from line 24 at a temperature of about —100° F. passes down through the absorber in countercurrent contact with the upflowing gas to absorb the bulk of the $CO_2$ in the gas. The rich liquid exits through line 26 at a temperature of 5° F. Unabsorbed gas leaving absorber 22 at about —100° F. flows up through lean absorber 28 in countercurrent contact with lean liquid, also acetone, which enters absorber 28 through line 30 at about —100° F., absorbs $CO_2$ from the gas and leaves through line 32 at a temperature of about —90° F. The purified gas leaving absorber 28 through line 34 at about —100° F. has by volume about 94.1% $H_2$, 3.7% CO, 2.2% $CH_4$ and less than 50 parts per million of $CO_2$. Acetone vapor is removed from the gas in an adsorber 36. In heat exchanger 38, some cold is transferred from the purified gas to the warm rich liquid withdrawn from absorber 22 through line 40 and returned by pump 42. The purified gas is warmed to —65° F. in exchanger 38 and thence passes through heat exchanger 14 wherein it is further warmed to 90° F. by the incoming gas. At —65° F., the purified gas does not cause the feed gas to form frozen deposits in exchanger 14.

Warm rich liquid leaving absorber 22 by way of line 26 is cooled to about 0° F. by an external source of refrigeration applied at heat exchanger 44, and then to about —6° F. by flow through heat exchanger 46 in heat exchange relation with the lean liquid of line 32. After this, the rich liquid is flashed to 10 p.s.i.g. by throttling valve 48 and passed into separator 50. Throttling causes evolution of gaseous $CO_2$ from the rich liquid and a temperature decline to about —60° F. Gaseous $CO_2$ passes from separator 50 into line 52 while the rich liquid passes through line 54 into rich stripper 56. $CO_2$ still in the rich liquid is removed in stripper 56 by countercurrent contact of the rich liquid with stripping gas. Stripping further cools the rich liquid so that it exits through line 58 at about —118° F. Pump 60 repressurizes the stripped rich liquid, heat exchanger 62 abstracts refrigeration, and line 24 returns the liquid at —100° F. to rich absorber 22.

Lean liquid leaving absorber 28 through line 32 at about —90° F. is warmed in heat exchanger 46 to about —30° F. by the rich liquid of line 26. The lean liquid is then depressurized through valve 80 to about 10 p.s.i.g. and passed into lean stripper 64. There the lean liquid is stripped of $CO_2$ by countercurrent contact with stripping gas. Stripped lean liquid leaving stripper 64 through line 66 at a temperature of about —37° F. is repressurized by pump 68 and recooled to —100° F. in heat exchanger 62 by the stripped rich liquid of line 58. Thence, recooled lean liquid is returned through line 30 to lean absorber 28.

Any suitable stripping gas such as air or $N_2$ enters lean stripper 64 from line 74 at about —20° F. after passing through heat exchanger 75 to strip $CO_2$ from the lean liquid. Stripping gas along with $CO_2$ passes from lean stripper 64 at about —30° F. into rich stripper 56 where it also strips $CO_2$ from the rich liquid. The mixture of $CO_2$ and stripping gas leaving rich stripper 56 through line 76 at about —60° F. is joined by the gaseous $CO_2$ leaving separator 50 by way of line 52 for combined flow through line 78 to heat exchanger 14 wherein it is warmed by the incoming feed gas to a discharge temperature of about 90° F. Part of the gas in line 78 passes through exchanger 75 to cool the stripping gas. Using air for stripping gas, the volume composition of the stream in line 78 is: $CO_2$ 70.9%, air 28.3%, CO 0.4% and $H_2$ 0.4%.

Loss of rich and lean liquid vapors in the outgoing $CO_2$ and stripping gas may be reduced by interposing an adsorber 70 between lines 76 and 78 to remove these vapors from the outgoing gases. As shown, while $CO_2$ and stripping gas at —60° F. flow through adsorber 70, stripping gas at —20° F. flows in the reverse direction through a similar adsorber 72. Periodically the flows are switched so that stripping gas passes through adsorber 70 to remove acetone adsorbed during the previous period and thus regenerate the adsorbent, while outgoing $CO_2$ and stripping gas pass through regenerated adsorber 72. In this fashion, vaporized acetone is returned to the absorption system with the stripping gas.

Referring to Figure 2 wherein like numbers indicate members already described in connection with Figure 1, and for purposes of comparison using the same ammonia synthesis gas used in Figure 1, this gas is passed at the rate of 59.3 million standard cubic feet per day through heat exchanger 14 and from separator 16 through line 20 at about —50° F. to heat exchanger 100 where it is further cooled to —60° F. $CO_2$ liquefied in exchanger 100 is removed in separator 102 from the gas which continues to flow in line 20 to rich absorber 22. Liquefied $CO_2$ amounting to about 6.5 million standard cubic feet per day passes from separator 102 through line 104 and throttling valve 106 where the pressure reduction, suitably to 70 p.s.i.g., further cools the liquid $CO_2$. The throttled $CO_2$ is revaporized in heat exchanger 100 against the feed gas. Thus the $CO_2$ provides the refrigeration necessary for the partial liquefaction and separation.

In Figure 2, because the gas enters absorber 22 at a lower temperature and with a lower $CO_2$ content, rich liquid leaves absorber 22 through line 26 at about $-8°$ F. It is then cooled in heat exchanger 108 to $-11°$ F. by a cold gaseous product and in heat exchanger 46 to $-18°$ F. by the $-90°$ F. lean liquid in line 32. The rich liquid is flashed through throttling valve 110 to about 27 p.s.i.g. and $-50°$ F. Generally, throttling to a pressure in the range of 20 to 80 p.s.i.g. will evolve a substantial portion of the $CO_2$ from the rich acetone and permit a high recovery of refrigeration. Rich liquid is removed from gaseous $CO_2$ in separator 112 and passed through line 114 and throttling valve 116 into rich stripper 56, entering there at about 3 p.s.i.g. and $-73°$ F. Stripped rich liquid leaving stripper 56 through line 58 and pump 60 at about $-124°$ F. is warmed to $-100°$ F. in heat exchanger 62 by the stripped lean liquid of line 66. The lean liquid circuit of Figure 2 is the same as that of Figure 1, but the rich liquid temperature in line 58 is 6° F. lower and the stripping gas (suitably, air at the rate of 5.5 million standard cubic feet per day) enters from line 74 at $-80°$ F., causing the lean liquid in line 66 to be colder, i.e., $-48°$ F. Attainment in heat exchanger 62 of the desired $-100°$ F. temperature for the liquid in lines 24 and 30 is made possible by balancing liquid circulation rates. Thus, for the same initial volume of gas fed at 10, the lean liquid circulation rate is substantially the same in Figures 1 and 2, but the rich liquid circulation rate for Figure 2 (250 gallons per minute) is only about half the rate used in Figure 1.

Separated $CO_2$ provides enough refrigeration to eliminate the need for an outside source of refrigeration. The $CO_2$ leaving heat exchanger 100 through line 118 is at about $-65°$ F. and may provide the refrigeration needed in heat exchanger 108 or, as shown, part of it flows through line 120 for warming to 78° F. in heat exchanger 14 by the feed gas and then admixes with the remainder of the $CO_2$ for combined flow in line 122. Valve 124 proportions the split in this $CO_2$ stream to achieve a desired temperature in line 122, e.g., 25° F., but more generally any temperature which will avoid deposition of $CO_2$ frost upon subsequent expansion to a lower pressure. The $CO_2$ in line 122 is expanded to 27 p.s.i.g. in expander 126, admixed with $CO_2$ removed from separator 112 by line 128, and expanded through expander 130 to atmospheric pressure and $-105°$ F. If desired, an adsorber (not shown) may be placed in line 132 after expander 130 to recover any rich liquid vapors in the gaseous $CO_2$ stream. The foregoing expansions produce enough refrigeration to allow withdrawal of $-105°$ F. $CO_2$ through line 82 at the rate of 4.4 million standard cubic feet per day to cool the stripping gas in heat exchanger 84 to the entering temperature of $-80°$ F.

The expanded $CO_2$ may be passed through heat exchanger 108 to cool the rich liquid of line 26. Alternatively, as shown in Figure 2, this cold stream may be passed through heat exchanger 134 used in lieu of the pair of regenerative adsorbers 70, 72 to remove rich liquid vapors from the stream of stripping gas and $CO_2$ leaving stripper 56 through line 76. The cold $CO_2$ stream in line 132 cools the stripping gas stream of line 76 in exchanger 134 to about $-90°$ F., condensing most of the rich liquid vapors. The condensate is suitably returned to rich stripper 56. The "dried" stripping gas from exchanger 134 is passed by continuing line 76 through heat exchanger 108 and thereafter admixed with the $CO_2$ stream from line 132 for combined flow in line 78 through exchanger 14, exiting finally at about 78° F. at the rate of 24.3 million standard cubic feet per day and containing 76.4% $CO_2$, 22.5% air, 0.5% $H_2$ and 0.5% CO by volume. The synthesis gas purified to the same extent as with Figure 1 is recovered at 78° F. after passing through line 34 and exchanger 14 at the rate of 36.1 million standard cubic feet per day.

The foregoing description of the absorption systems of Figures 1 and 2 have been based on the processing of the same ammonia synthesis gas supplied at the same rate, temperature and pressure, and recovered with the same degree of purification. Thus the two absorption systems have been described on a basis which permits direct comparisons at various points in the systems. The illustrative synthesis gas containing 38.4% by volume of $CO_2$ is one which has a sufficiently high content of $CO_2$ so that it can be purified by the absorption system of Figure 2 without employing any extraneous refrigeration. At the same time, this illustrative synthesis gas may be purified in the absorption system of Figure 1 using refrigeration from an outside source at only a slight increase in operating cost over the operating cost obtained with the system of Figure 2. In either case, the cost is less than half of that when a conventional diethanolamine plant is used. The absorption system of Figure 2 is suitable only for gases having a high content of $CO_2$ or other gaseous component which is to be separated by absorption from the feed gas, whereas the system of Figure 1 is primarily useful for feed gases having an insufficient content of the gaseous component which is to be eliminated by absorption to provide the necessary refrigeration to make the system self-sufficient. Accordingly, another illustrative use of the system of Figure 1 will now be given in terms of a feed gas containing only 25% by volume of $CO_2$.

A hydrogen-rich gas containing by volume 70.7% $H_2$, 2.5% CO, 25.0% $CO_2$, 1.5% methane and higher hydrocarbons, and traces of moisture and $H_2S$ is supplied at a pressure of 400 p.s.i.g. and temperature of 100° F. to heat exchanger 14 of Figure 1. A small amount of acetone is added to this feed gas by way of line 12 as previously described. The feed gas enters rich absorber 22 at $-50°$ F. and after passing therethrough as well as through lean absorber 28, enters heat exchanger 38 at $-100°$ F. Thence the purified gas flows at a temperature of $-65°$ F. to exchanger 14 and discharges at 90° F. Rich liquid drains from absorber 22 at $-15°$ F. and is cooled by outside refrigeration in exchanger 44 to $-21°$ F. The rich liquid is further cooled to $-23°$ F. in a heat exchanger (not shown) by part of the waste gas flowing into line 78 from duplicate adsorbers 70, 72. In heat exchanger 46, the rich liquid is cooled to $-34.5°$ F. by lean liquid leaving absorber 28 at a temperature of $-88°$ F. and proceeding at $-30°$ F. to lean stripper 64. At a pressure of 10 p.s.i.g., the lean liquid is stripped by a counterflow of stripping gas entering stripper 64 at a temperature of $-20°$ F. Lean liquid at a temperature of $-38°$ F. flows through line 66 and pump 68 to heat exchanger 62 wherein the lean liquid is cooled to $-100°$ F. The thus cooled lean liquid enters the top of lean absorber 28.

The rich liquid at $-34.5°$ F. passes through throttling valve 48 into separator 50 where the bulk of the absorbed $CO_2$ is separated as a gas at a pressure of approximately 10 p.s.i.g. and temperature of $-62.5°$ F. The rich liquid passes through line 54 to the top of rich stripper 56 and finally issues therefrom at $-121°$ F. The stripped rich liquid is then pumped through exchanger 62 and back to the top of absorber 22 at a temperature of $-100°$ F. The waste gas comprising the stripping gas and $CO_2$ separated from the feed gas enters exchanger 14 at $-62.5°$ F. and exits at 90° F.

The preferred embodiments of this invention are characterized by the high temperature differential across the various heat exchange surfaces. For example, heat exchangers 46 and 62 have temperature differentials as high as 80° F. In the example of Figure 2 where excess refrigeration is available, a 22° F. temperature differential is allowed at the warm end of heat exchanger 14, while in the examples of Figure 1 that temperature differential is held to 10° F. to minimize the use of outside refrigeration.

In view of the various modifications of the invention which will occur to those skilled in the art upon consideration of the foregoing disclosure without departing from the spirit or scope thereof, only such limitations should be imposed as are indicated by the appended claims.

What is claimed is:

1. An absorption process which comprises chilling mixed gases to liquefy a minor portion of a component thereof, separating the liquefied portion of said component from said mixed gases, then passing said mixed gases through a high pressure rich absorption zone in countercurrent contact with a rich absorber liquid whereby the major portion of said component of said mixed gases is absorbed to enrich said rich absorber liquid with a resultant rise in liquid temperature, passing residual mixed gases from said rich absorption zone through a high pressure lean absorption zone in countercurrent contact with a lean absorber liquid whereby more of said component is absorbed to enrich said lean absorber liquid, warming enriched lean absorber liquid by indirect heat exchange with enriched rich absorber liquid which is thereby cooled, stripping said component from the warmed enriched lean absorber liquid at a reduced pressure, stripping said component from the cooled enriched rich absorber liquid at a reduced pressure, passing the stripped lean and stripped rich absorber liquids in indirect heat exchange relation with one another, thereafter returning said stripped liquids to their respective absorption zones, expanding the separated liquefied portion of said component with the performance of external work to produce refrigeration, and supplying said refrigeration to said absorption process.

2. The absorption process of claim 1 wherein a stripping gas is passed in countercurrent contact with first the lean absorber liquid undergoing stripping and then the rich absorber liquid undergoing stripping.

3. The absorption process of claim 1 wherein the component of the mixed gases which is liquefied and absorbed is carbon dioxide, and acetone is used as the absorber liquid in both the rich and the lean absorption zones.

4. An absorption process which comprises chilling a stream of mixed gases by indirect heat exchange with a cold stream of said mixed gases from which the major portion of a component thereof has been separated by low-temperature absorption and with a cold stream containing at least part of the thus separated component, said chilling of said stream of mixed gases effecting liquefaction of a minor portion of a component thereof, separating the liquefied portion of said component from said chilled stream, then passing said chilled stream successively in countercurrent contact with a rich absorber liquid in a rich absorption zone at elevated pressure and a lean absorber liquid in a lean absorption zone at elevated pressure to absorb from said chilled stream the major portion of said component, effecting indirect heat exchange between the resulting enriched rich and enriched lean absorber liquids and then stripping said component from said liquids at reduced pressure, and again effecting indirect heat exchange between the stripped rich and stripped lean absorber liquids and returning said stripped liquids to their respective absorption zones.

5. The absorption process of claim 4 wherein a liquid freezing-point depressant is introduced into the stream of mixed gases undergoing chilling to prevent solidification of the component which is liquefied.

6. The absorption process of claim 4 wherein a stripping gas is passed in countercurrent contact with first the lean absorber liquid undergoing stripping and then the rich absorber liquid undergoing stripping.

7. The absorption process of claim 4 wherein the component of the mixed gases which is liquefied and absorbed is carbon dioxide, acetone is used as the absorber liquid in both the rich and the lean absorption zones, the maximum liquid temperature in the rich absorption zone is in the range of about $-15°$ to $15°$ F., the separated liquefied portion of carbon dioxide is expanded with the performance of external work to produce refrigeration, and said refrigeration is supplied to said absorption process.

8. An absorption system comprising an absorption tower having an upper lean absorption section and a lower rich absorption section, a gas inlet in the lower portion of said rich absorption section, a gas outlet in the upper portion of said lean absorption section, a liquid inlet in the upper portion of said lean absorption section, a liquid outlet in the lower portion of said lean absorption section, a liquid inlet in the upper portion of said rich absorption section, a liquid outlet in the lower portion of said rich absorption section, a stripping tower having an upper rich stripping section and a lower lean stripping section, a gas inlet in the lower portion of said lean stripping section, a gas outlet in the upper portion of said rich stripping section, a liquid inlet in the upper portion of said rich stripping section, a liquid outlet in the lower portion of said rich stripping section, a liquid inlet in the upper portion of said lean stripping section, a liquid outlet in the lower portion of said lean stripping section, a refrigerating heat exchanger connected to cool liquid flowing from said outlet of said rich absorption section, a first heat exchanger connected for flow of liquid from said refrigerating heat exchanger to said liquid inlet of said rich stripping section and for flow of liquid from said liquid outlet of said lean absorption section to said liquid inlet of said lean stripping section, a second heat exchanger connected for flow of liquid from said liquid outlet of said rich stripping section to said liquid inlet of said rich absorption section and for flow of liquid from said liquid outlet of said lean stripping section to said liquid inlet of said lean absorption section, and a third heat exchanger connected for the flow of gas from an external source to said gas inlet in the lower portion of said rich absorption section and for the countercurrent flows of gas from said gas outlet in the upper portion of said lean absorption section and gas from said gas outlet in the upper portion of said rich stripping section.

9. A process for separating one component of mixed gases by absorption in and desorption from absorber liquid, which comprises passing mixed gases at high pressure first through a rich absorption zone in countercurrent contact with rich absorber liquid and then through a lean absorption zone in countercurrent contact with lean absorber liquid to enrich both said liquids by absorption of a component of said mixed gases, cooling enriched rich absorber liquid, stripping said component from the cooled enriched rich absorber liquid and enriched lean absorber liquid at a pressure lower than said high pressure by passing a stripping gas in countercurrent contact therewith to yield said rich absorber liquid and said lean absorber liquid, and introducing said rich absorber liquid and said lean absorber liquid into said rich absorption zone and said lean absorption zone, respectively, for passage in countercurrent contact with said mixed gases as aforesaid.

10. The process of claim 9 wherein the mixed gases are chilled prior to passage through the rich absorption zone by countercurrent flow in indirect heat exchange relation with the mixed gases which have passed through the lean absorption zone and with the stripping gas after said stripping gas has been in countercurrent contact with the cooled enriched rich absorber liquid.

11. The process of claim 10 wherein a liquid freezing-point depressant is introduced into the mixed gases undergoing chilling, and a component of said mixed gases is liquefied during the chilling thereof.

12. A process for separating carbon dioxide from mixed gases containing carbon dioxide by absorption in and desorption from absorber liquid, which comprises passing said mixed gases through a high pressure absorption zone in countercurrent contact first with a rich absorber liquid and then with a lean absorber liquid to enrich both said liquids by absorption of carbon dioxide from said mixed gases, maintaining the maximum liquid temperature in said high pressure absorption zone not above 15° F., cooling enriched rich absorber liquid, stripping carbon dioxide from the cooled enriched rich absorber liquid and enriched lean absorber liquid at a pressure lower than that of said high pressure absorption zone, and introducing stripped rich absorber liquid and stripped lean absorber liquid into said high pressure absorption zone in countercurrent contact with said mixed gases as aforesaid.

13. The process of claim 12 wherein acetone is used as both rich absorber liquid and lean absorber liquid and the stripping of carbon dioxide is effected by passing a stripping gas in countercurrent contact with said acetone.

14. The process of claim 12 wherein the mixed gases are chilled prior to passage through the high pressure absorption zone to liquefy a portion of the carbon dioxide therein, the liquefied portion is separated from said mixed gases and expanded with the performance of external work to produce refrigeration, and said refrigeration is supplied to the process.

15. In an absorption system comprising an absorption tower having an upper lean absorption section and a lower rich absorption section and a stripping tower having an upper rich stripping section and a lower lean stripping section, the improvement which comprises a cooling heat exchanger to cool the absorber liquid leaving said lower rich absorption section, a pump to pressurize absorber liquid leaving said upper rich stripping section and to introduce the pressurized absorber liquid into said lower rich absorption section, and a pump to pressurize absorber liquid leaving said lower lean stripping section and to introduce the pressurized absorber liquid into said upper lean absorption section.

16. The absorption system of claim 15 wherein a multi-stream heat exchanger is connected to the absorption tower for the passage therethrough of the gas streams flowing to and from said absorption tower.

17. The absorption system of claim 16 wherein the bottom of the lower lean stripping section is provided with an inlet for the introduction of a stripping gas and the top of the upper rich stripping section is connected with the multi-stream heat exchanger for the flow of said stripping gas from said top through said multi-stream heat exchanger.

18. A process for separating a normally gaseous component of mixed gases by absorption in and desorption from absorber liquid, which comprises passing mixed gases at high pressure first through a rich absorption zone in countercurrent contact with rich absorber liquid at a temperature not above 15° F. and then through a lean absorption zone in countercurrent contact with lean absorber liquid to enrich both said liquids by absorption of a normally gaseous component of said mixed gases, cooling enriched rich absorber liquid, stripping said normally gaseous component from the cooled enriched rich absorber liquid and enriched lean absorber liquid at a pressure lower than said high pressure to yield said rich absorber liquid and said lean absorber liquid, and introducing said rich absorber liquid and said lean absorber liquid into said rich absorption zone and said lean absorption zone, respectively, for passage in countercurrent contact with said mixed gases as aforesaid.

19. The process of claim 18 wherein the normally gaseous component of the mixed gases to be absorbed in and desorbed from absorber liquid is carbon dioxide, and rich absorber liquid is passed in indirect heat exchange relation with lean absorber liquid before said rich absorber liquid and said lean absorber liquid are introduced itno the rich absorption zone and the lean absorption zone, respectively.

20. The process of claim 19 wherein acetone is used as both rich absorber liquid and lean absorber liquid, and the stripping of carbon dioxide is effected by passing a stripping gas in countercurrent contact with said acetone.

21. The process of claim 20 wherein the mixed gases are chilled prior to passage through the rich absorption zone by countercurrent flow in indirect heat exchange relation with the mixed gases which have passed through the lean absorption zone and with the stripping gas after said stripping gas has been in countercurrent contact with the cooled enriched rich absorber acetone.

22. The process of claim 18 wherein the stripping of the normally gaseous component is effected by passing a stripping gas in countercurrent contact with absorber liquid, and said stripping gas is then passed in indirect heat exchange relation with the mixed gases prior to the passage of said mixed gases through the rich absorption zone.

23. The process of claim 18 wherein rich absorber liquid is passed in indirect heat exchange relation with lean absorber liquid before said rich absorber liquid and said lean absorber liquid are introduced into the rich absorption zone and the lean absorption zone, respectively.

24. The process of claim 23 wherein the stripping of the normally gaseous component is effected by passing a stripping gas in countercurrent contact with absorber liquid, and said stripping gas is then passed in indirect heat exchange relation with enriched rich absorber liquid to effect cooling of said enriched rich absorber liquid.

25. The absorption system of claim 16 wherein a heat exchanger is connected to the absorption tower for the prior passage therethrough of the absorber liquid introduced into the lower rich absorption section and of the absorber liquid introduced into the upper lean absorption section.

26. The absorption system of claim 14 wherein a heat exchanger is connected to the absorption tower for the prior passage therethrough of the absorber liquid introduced into the lower rich absorption section and of the absorber liquid introduced into the upper lean absorption section, and means are provided for passing a stripping gas up through the lower lean stripping section and the upper rich stripping section in succession.

References Cited in the file of this patent

UNITED STATES PATENTS

| | | |
|---|---|---|
| 2,048,656 | Hunt et al. | July 21, 1936 |
| 2,261,925 | Moore et al. | Nov. 4, 1941 |
| 2,596,785 | Nelly et al. | May 13, 1952 |

UNITED STATES PATENT OFFICE
CERTIFICATE OF CORRECTION

Patent No. 2,880,591                                    April 7, 1959

Mooson Kwauk

It is hereby certified that error appears in the printed specification of the above numbered patent requiring correction and that the said Letters Patent should read as corrected below.

Column 3, line 52, for "th etop" read -- the top --; column 10, line 43, claim reference numeral, for "16" read -- 17 --; line 49, claim reference numeral, for "14" read -- 15 --.

Signed and sealed this 8th day of September 1959.

(SEAL)
Attest:

KARL H. AXLINE
Attesting Officer

ROBERT C. WATSON
Commissioner of Patents